United States Patent Office 3,171,869
Patented Mar. 2, 1965

3,171,869
PROCESS FOR MANUFACTURING CURVED
OPTICAL ARTICLES
Joseph W. Weinberg, Cleveland Heights, Ohio, assignor, by mesne assignments, to Bausch & Lomb Incorporated, Rochester, N.Y., a corporation of New York
No Drawing. Filed Dec. 7, 1959, Ser. No. 857,539
11 Claims. (Cl. 264—1)

This invention relates to a process for manufacturing curved optical articles and particularly to a process of releasing such articles from the mold in which they are prepared.

The production of optical articles such as spectacle lenses made of transparent synthetic resins has been known for many years. One of the earliest processes of manufacturing such lenses is described in Patent No. 2,314,838 to Kingston, patented March 23, 1943. Kingston employed alkyl methacrylate polymers, and these are well suited to this use because of their lightness, resistance to shock, and optical clarity, but unfortunately these polymers have a very low scratch resistance, and their surfaces quickly become marred, which of course limits their usefulness.

Moreover, the production of optically accurate lenses by molding synthetic plastics in dies, the process described by Kingston, presents exceptional processing difficulties. It is imperative that the surface contour and finish of lenses be true, since otherwise power may be introduced where it is not desired. Synthetic plastics expand and contract with increase and decrease in temperature, and when formed in a mold by heat and pressure the resulting article has a tendency to shrink in cooling. In order to preserve the shape imparted to the surface by the mold and the surface finish of the article, it is imperative that the mold surfaces remain firmly in contact with the optical article until it has set. It is also necessary that the article not adhere to the mold to such an extent that it cannot be freed therefrom after cooling. These requirements necessitate the use of complicated molding equipment, as exemplified in Patents Nos. 2,319,014, patented May 11, 1943 and 2,333,051 patented October 26, 1943 to C. V. Smith.

In order to overcome the low scratch resistance of alkyl methacrylate polymers, it was proposed by Johnson, Patent No. 2,640,227, patented June 2, 1953, to superimpose an external layer of a second material having a better scratch resistance. This, however, complicates the lens-forming procedure in an extraordinary way, and has not come into commercial practice for the manufacture of ophthalmic lenses.

Polymers of monomeric liquid mixed esters of polyhydric alcohols and acid esters of carbonic acid with unsaturated alcohols can be molded to a sufficiently clear substitute for optical glass. This offers the attractive possibility of casting liquid monomer in a mold conforming to the configuration of the optical article desired. Unfortunately, the polymerization of these monomers in such enclosed molds presents surprising difficulties.

The monomeric material polymerizes slowly. Because of this, Muscat and Strain, in Patent No. 2,384,115 patented September 4, 1945, and Patent 2,385,930, patented October 2, 1945, point out that considerable monomer may be retained by the polymer during polymerization, and that considerable difficulty is accordingly encountered in obtaining complete or substantially complete polymerization of the residual monomer. A final polymer that is incompletely polymerized is less hard than would be desirable, and also has a low scratch resistance. Muscat and Strain accordingly recommend the removal of all or a portion of the monomer from the polymer at the fusible stage, and prior to completion of the cure of the polymer to its infusible stage. This requires arresting the polymerization at the fusible stage, with distillation of the monomer from the polymer, or extraction of the monomer from the polymer by a solvent in which the polymer is insoluble. Thereafter, the polymerization is continued. But of course, it is not possible by this technique to do this in the same mold in which the initial monomer is cast. Moreover, the plastic would not thereafter be sufficiently controlled in its shrinkage for optical purposes, and the molding of the polymer in the fusible stage presents all of the difficulties encountered in the art in molding synthetic resins as set forth above.

In their later Patents Nos. 2,384,123 and 2,384,125, patented September 4, 1945, 2,385,933 patented October 24, 1954, and 2,403,113, patented July 2, 1946, Muscat and Strain suggest polymerization of the monomer in a mold made of glass in the form of plates separated by compressible gaskets or retainers and held together by screw clamps. The resin shrinks during the molding, and tends to draw away from the mold surfaces, but pressure is maintained upon the plates by tightening the clamps to compress the flexible gasket or retainer, and to permit the plate to remain in contact with the resin as it shrinks. The puropse here is to restrain the plastic against lateral shrinkage by the pressure of the plates, but this requires that the shrinkage in thickness be taken up by the compression of the gasket or retainer.

This technique is troublesome because of the constant attention required to the mold during the polymerization. It is possible to prepare flat sheets whose surfaces remain smooth by this procedure.

It is difficult to prepare lenses or other curved articles of non-uniform thickness by this process, because of the strains which are established during polymerization of the plastic, due to uneven shrinkage, in the areas of different thickness, as it proceeds from the fusible gel stage to the final hard infusible form. The polymer adheres strongly to the glass mold surface as indeed it must to conform to the intended optical surface, and as it shrinks unless it can release itself from the surface of this mold, or unless the mold follows the shrinkage, it will break the mold. In the case of positive lenses, the article almost invariably will break the mold, and in the case of negative lenses, it almost invariably releases prematurely from the mold surface during the polymerization. Either way, the desired optical article is not obtained.

These problems are recognized by Muscat and Strain, and in one of the alternative procedures described in these patents, they suggest that the strains established in the gel should be released if possible before the mold can be fractured. This is done by conducting the polymerization in a small mold to the gel stage, and the gel thereafter is shaped to the desired configuration and polymerized to the final infusible stage. In another modification, the gel after it is freed from the mold is coated on both sides with monomer or syrupy polymer in order to take up unevenness in the surface due to the polymerization up to this stage. However, this procedure is clearly not very satisfactory for the production of lenses and other optical articles of this type.

Another defect which frequently arises in the molding of optical articles non-uniform in thickness is the formation of cracks during initial polymerization. Cracks arise from the uneven shrinkage of the article during the molding. In order to prevent them, it is necessary to use a mold surface to which the polymer will adhere, such as glass. It is this adhesion, however, which may lead to mold breakage later.

Another problem is the preparation of a lens or cover piece of sufficient hardness and scratch resistance to resist ordinary wear. Scratch resistance depends to a great extent on completeness of cure, but a complete cure necessarily involves additional shrinkage, which accentuates the problems discussed above.

The shrinkage problem is of course accentuated by the fact that lenses are curved in a spherical or cylindrical fashion and not flat, depending upon the type that is being made.

The result of this problem is that the development of molding compositions and conditions applicable to all types of lenses to give lenses of uniform hardness, clarity, resistance to heat distortion and precision has been found to be extraordinarily difficult. The fact is that polymeric liquid mixed esters of polyhydric alcohol and acid esters of carbonic acid with unsaturated alcohols have been cast only with difficulty to form lenses in molds conforming to the configuration of the lens desired. It is apparent that an improved process for casting these liquid monomers in a mold conforming to the lens desired would be a considerable advance in the art.

This invention provides a process of casting such polymers with the careful control of polymerization conditions that is important in the production of optical articles of high precision such as ophthalmic lenses using glass molds while minimizing breakage, and the inventive feature is the method of releasing the finished optical article from the mold at the conclusion of the polymerization.

In accordance with the invention the article is brought to a temperature within the range from about 125 to about 235° C. just prior to completion of polymerization of the polymer, so that at the time the article undergoes its final polymerization, it is temporarily softened by heat so that the polymer chains can have sufficient mobility to be bonded together in cross-links. At the same time, the stress introduced by the polymerization can be relieved, without which relief the internal stress might cause cracking of lens and mold. On cooling, this softness disappears, due to the restoring of the attractive forces which are responsible in part for the hardness displayed by the lens at room temperature.

It is thought that the following theory explains what occurs in the process of the invention.

After completion of α-polymerization or gel stage, there is further change in:

(1) The number of covalent chemical cross-links arising from residual unsaturation of the double bonds on the monomer units already linked in a chain.

(2) The number of van der Waals cross-links arising from polarizable groups, not necessarily connected with residual unsaturation.

(3) The number of partially ionized sites in chains close to the mold surface that are correlated with oppositely charged sites on that surface.

(1) It requires activation at quite high temperatures (about 100° C.) or intervention of free radicals formed by dissociation of remaining catalyst, which, at the diminished concentration succeeding the α-stage also requires high temperature although not perhaps 100° C. The formation of covalent bonds hardens the material and improves its scratch resistance permanently, but also produces the characteristic shrinkage associated with polymerization. Because of the relative immobility of the activated units, internal stresses are set up in the already gelled material by additional cross-links. The accidental concentration in a particular region may create a stress center from which fracture may begin.

(2) The van der Waals links weaken or disappear entirely as hardening factors at temperatures less than 100° C., leaving only the covalent chemical cross-links as contributing to the rigidity of the material. This is a reversible phenomenon; these links form again when the material is cooled. The weakening or destruction of these links is a favorable factor since it allows for relief of stresses set up by further chemical cross-linking of type (1) in the gel or solid state. In fact, it is an essential feature of this process that many reversible thermal links must be loosened temporarily if further permanent chemical links are to be introduced in the already solid state without rupture by stress concentration. The relief of stress also allows massive readjustment of the material during the process of release from the mold surfaces.

(3) The electronegative or positive regions of the monomer unit (e.g. OH and H units) tend to become adsorbed in a specific pattern on the surface of the glass, i.e., the lens mold, to produce the adhesion. The adhesion becomes stronger as the polymerization proceeds because of the reduced mobility of the molecules. This is the cause of mold breakage during polymerization, which, is at a temperature so low that the polymer is not softened to accommodate the stresses introduced. It can be overcome by the internal stresses or by increased kinetic energy or temperature increase. As the temperature rises, the material would tend to become more uniform, and offset the reduction of adhesion, were it not for the stresses that are being continually reestablished by continued polymerization shrinkage. Hence, the softened solid must inevitably separate from the mold surfaces at some higher temperature, either when the temperature is reached or shortly after it is cooled from this temperature. The (temporary and reversible) equalization of stress and the reduced rigidity are favorable factors in producing smooth release.

At the time that the polymer acquires the final hard set it also acquires the quality of recovering the particular configuration it had at that time so that even if the article be distorted while being soft in being removed from the mold, it can be brought back to the mold configuration by a further heat treatment at a temperature of at least 75° C. up to about 235° C.

It is apparent from the above that the process of the invention is applicable to any liquid monomeric mixed ester of a polyhydric alcohol with an acid ester of carbonic acid and an unsaturated alcohol that undergoes significant shrinkage during polymerization. These monomers are now well known, and are fully described in the Muscat and Strain patents mentioned above. They can be defined by the following generic formula:

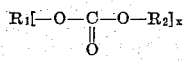

wherein $R_1$ is a saturated organic radical derived from a polyhydric alcohol having from two to thirty carbon atoms and from one to six hydroxyl groups, and having a valence of $x$, $R_2$ is an unsaturated aliphatic hydrocarbon radical having from two to ten carbon atoms, and from one to three $CH_2=CH_2$ groups and $x$ is a small whole number from 2 to 7.

Typical $R_1$ radicals are from polyhydric alcohols such as ethylene glycol, glycerol, polyethylene glycols such as diethylene glycol, triethylene glycol, and tetraethylene glycol, 1,2-propylene glycol, 1,3-propylene glycol, 1,2-butylene glycol, 1,3-butylene glycol, dipropylene glycol, tripropylene glycol, di-1,2-propylene glycol, tri-1,2-propylene glycol, di-1,2-butylene glycol, pentamethylene glycol, pinacol, alpha methyl tetramethylene glycol, alpha methyl pentamethylene glycol, octamethylene glycol, dodecamethylene glycol, 1,3-xylylene glycol, 1,4-xylylene glycol, decamethylene glycol, methyl glycerol, erythritol, pentaerythritol, polyglycerols, sorbitol, mannitol, halohydrins such as glycerol monochlorohydrin, resorcinol, pyrogallol, 1,3,5-trihydroxy benzene, phthalyl alcohol, 1,4-dihydrocyclohexane and 1,4-dioxanediol-2,3.

Typical $R_2$ radicals are derived from unsaturated alcohols, such as allyl alcohol, methallyl alcohol, crotyl alcohol, 2-chloroallyl alcohol, chlorocrotyl alcohol, ethylallyl alcohol, cinnamyl alcohol, propargyl alcohol, methyl vinyl carbinyl alcohol, or other lower unsaturated alcohol particularly alcohols capable of forming polymerizable esters.

These carbonate esters may be obtained by the reaction of a saturated chloroformate with the corresponding polyhydric alcohol. They may also be prepared by forming the polychloroformate of the polyhydric alcohol and treating this with the corresponding unsaturated alcohol. Preparatory procedures are given in the Muscat and Strain patents referred to.

As exemplary of the monomers which can be polymerized in accordance with this invention, there can be mentioned ethylene glycol bis(allyl carbonate), ethylene glycol bis(methallyl carbonate), diethylene glycol bis-(allyl carbonate), diethylene glycol bis(methallyl carbonate), triethylene glycol bis(allyl carbonate), triethylene glycol bis(methallyl carbonate), the carbonate diester of allyl salicylate, 1,2-propylene glycol bis(allyl carbonate), trimethylene glycol bis(methallyl carbonate), tetramethylene glycol bis(allyl carbonate), tetramethylene glycol bis(methallyl carbonate), dipropylene glycol bis(allyl carbonate), dipropylene glycol bis(methallyl carbonate), glycerol bis(allyl carbonate), glycerol tris (allyl carbonate), glycerol tris(methallyl carbonate), pentaerythritol tetrakis(allyl carbonate), erythritol tetrakis(allyl carbonate), ethylene glycol bis(crotyl carbonate), ethylene glycol bis(isocrotyl carbonate), ethylene glycol bis(methyl ethynyl carbinyl carbonate), ethylene glycol bis(ethylallyl carbonate), ethylene glycol bis(2-chlorallyl carbonate), ethylene glycol bis(cinnamyl carbonate), glycerol tris(cinnamyl carbonate), triethylene glycol bis(allyl carbonate), triethylene glycol bis(methallyl carbonate), triethylene glycol bis(chlorallyl carbonate), tetraethylene glycol bis(allyl carbonate), and tetraethylene glycol bis(crotyl carbonate).

The polymerization can be effected by heating or by ultraviolet light. The time required for the heat polymerization is shortened and the extent of polymerization obtainable made more nearly complete by incorporating a polymerization catalyst in the reaction mixture. A catalyst is unnecessary when ultraviolet light is used. Ozone, nascent oxygen and peroxides are all effective catalysts, but of the these peroxides are the easiest to use.

Typical peroxides are benzoyl peroxide, lauroyl peroxide, barium peroxide, lead peroxide, hydrogen peroxide and the organic peroxycarbonates. The latter are preferred. Their preparation is described in Patent No. 2,370,588 to Strain.

The monomeric peroxycarbonates are oily liquids or white solids, and the polymeric peroxycarbonates are solids or adhesive pastes. All decompose upon heating to yield gaseous constituents. Typical compounds in this group are isopropyl peroxycarbonate, methyl peroxycarbonate, ethyl peroxycarbonate, allyl peroxycarbonate, n-butyl peroxycarbonate, ethyl lactyl peroxycarbonate, tetrahydrofurfuryl peroxycarbonate, lauryl peroxycarbonate, cyclohexyl peroxycarbonate, benzyl peroxycarbonate and ethylene glycol bis(peroxycarbonate). Other useful percarbonates are listed in the Strain patent.

Non-oxidizing polymerization catalysts such as azobis-isobutyro dinitrile also can be used. Such catalysts are preferred when there are present components which would be destroyed by oxidizing agents, such as some dyes and ultra violet absorbers.

In order to obtain the full benefit of the heat treatment in accordance with the invention, it is desirable to employ at least 1% catalyst by weight, and preferably the amount is from 3 to 6%. As much as 7.5% has been used without disadvantage, and more could be used if desired. Since these compounds are expensive and have a tendency to polymerize themselves at high concentrations, shortening the shelf-life of the monomer, it is usually desirable to keep the amount as low as possible, keeping in mind the desired result.

In order to improve the hardness and resistance to surface scratching of the final polymer, there may be included in the reaction mixture a small proportion of a monomer copolymerizable with these carbonate esters.

Many unsaturated monomers are capable of copolymerizing with these monomers to form a final polymer molecule of which both components form a part. Typical of such copolymerizable monomers are triallyl cyanurate, acrylates and alpha-substituted acrylates, for example, methyl acrylate, methyl methacrylate, and ethylene glycol methacrylate, ethylene glycol dimethacrylate, ethylidene glycol dimethacrylate, vinyl acetate, vinyl chloride, styrene, allyl esters such as allyl acetate, allyl maleate, diallyl diglycolate, diallyl maleate, allyl fumarate, allyl phthalate, allyl succinate, allyl oxalate, allyl tartrate, and the corresponding vinyl, crotyl, methallyl, 2-chlorallyl and other unsaturated alcohol esters, including for example, the unsaturated alcohols mentioned above in connection with the general formula on page 11 as well as saturated alcohol esters of other unsaturated acids, such as ethylene glycol maleate, propylene glycol maleate, dipropylene glycol maleate, tripropylene glycol maleate, butylene glycol maleate, hexylene glycol maleate, 2,4-pentanediol maleate, ethylene glycol fumarate, glycerol maleate, glycerol fumarate, 2-ethyl hexanediol maleate, diethylene glycol maleate, and triethylene glycol maleate.

Products of widely varying composition and physical properties can be obtained by varying the proportions and composition of such mixtures. The amount of the supplemental copolymerizable monomer will not exceed 50% by weight of the monomer present, and usually optimum improvement in the properties of the polymer is obtained by using a copolymerizable monomer in the range of 1% to 25% by weight of the total monomer present.

The composition may also contain soluble and insoluble inert substances which do not affect its optical transparency, such as transparent plasticizers, softening agents, lubricating agents and fillers, having the same or a similar optical index, or of such a size that transmitted light is not scattered, for example, dibutyl phthalate, dicyclohexyl phthalate, triacetin, trilauryl phosphate, tricresyl phosphate, colloidal silica, and natural or synthetic resins, for instance, diethylene glycol bis(allyl carbonate) polymer and diallyl phthalate. For the preparation of tinted optical articles such as sun glasses, organic dyestuffs and pigments of such a size that transmitted light is not scattered, may be incorporated, such as acetate dyes, oil-soluble dyes, methylene blue and methyl orange, tinted glass beads, iron powder, blue toner, and chlorophyll. To prevent ultraviolet light from reaching the eye, and to prevent its destructive action on the finished polymer, an ultraviolet light absorbing compound such as 2-methoxy-4-hydroxy benzophenone, and analogous compounds, can be added. Such compounds are well known. All of these ingredients can be included in the monomer before polymerization. The finished polymer can also be tinted, however. The inert ingredients such as fillers may advantageously be used to lessen shrinkage.

Usually, such ingredients would be used in amounts ranging from about 0.1 to about 40%.

The monomer compositions of the invention are polymerized in hard-surfaced molds whose interior configuration corresponds to that needed to give the surface configuration desired in the optical article after shrinkage. It is thus possible to prepare an optical article in the final shape necessary to give the desired effect with accuracy and precision, without the need for polishing or any other modification of the cast article other than edging to fit a frame.

The mold surface of preference for forming an optical article from these monomers by heat polymerization is glass, since this is readily prepared in the desired configuration and can be highly polished to impart a polished surface to a polymer. Fused silica, quartz, or other ultra-violet transparent material is used when ultra-violet light is the source of energy. It is customary to use two piece molds separated by a compressible gasket and firmly held together by a clip. The compressible gasket and the clip serve to seal the monomer in the mold while still liquid. Pressure should be maintained for so long as the monomer remains liquid, and the gasket must remain sufficiently hard during this phase. The adhesion of the composition to the surface restrains the polymer against lateral shrinkage, and holds the mold surface in contact with the resin throughout polymerization.

Ophthalmic lenses to meet any corrective or safety requirement are obtainable. Lenses with refractive power, including sphere, cylinder and prism, are obtained by forming the concave face of the top mold half to the sphere prescription of the lens, and the convex face of the bottom mold half to the cylinder prescription, as required. It is possible by the process to prepare lenses having minus and plus spheres ranging from −9.50 to +16.00 and beyond, and minus cylinders ranging from 0.00 to 4.00 and beyond. Prism corrections can also be introduced by introducing wedge to the gasket. Bifocals and trifocals can also be made, by recessing or advancing a portion of either mold face, as required. These can be made with a minimum of mold breakage, and a yield of from at least 50 to 70% of lenses surpassing optical specifications. This yield is extraordinary.

Plano lenses can be of any desired shape, having cooperating surfaces of compensating power, so that the total is zero, such as spherical or cylindrical or toric, of zero power. Safety lenses are often spheres of zero power and plano gas mask lenses can be plano cylinders.

In the process of the invention, the monomer composition is filled into the mold, and then the polymerization is carried out at an elevated temperature within the range from about 25° to about 120° C. or by activating radiation such as ultra-violet light. Shrinkage of the polymer amounts to about 14% in polymerizing from the liquid to the final stage of infusibility. The polymerization is carried out in several stages, increasing the temperature in each stage. The first stage is at a low temperature because the initial reaction from the liquid to the gel stage is exothermic, and the heat liberated must be removed, and at a low temperature the reaction is slowed sufficiently to permit efficient heat removal. The second and later stages must take place at a higher temperature, in order to compensate for the exhaustion of reactive material, and in order to secure the appropriate physical state of the polymer. This is done as rapidly as may be desirable.

In the case of lenses incorporating a refractive correction, it is desirable to control polymerization in the oven to maintain the polymer in the gel stage, short of a hard set, and then complete polymerization to a hard set outside the oven by a rapid high temperature heat treatment. Plano lenses uniform in thickness and relatively flat in curvature may not require this special care, and polymerization to a hard set can be completed in the oven in the final high temperature heat treatment.

In preparing the first-mentioned corrective lenses, in order to heat-polymerize the monomer to a gel stage short of hard set but uniformly, and without introduction of surface imperfections due to uneven shrinkage, in the process of the invention, the monomer is heat-polymerized in three increasing temperature stages. At the conclusion of this heating, at least 80% and preferably 90% of the monomer composition has been polymerized to the infusible gel stage, but short of hard set.

For example, in the first heating stage the composition is heated at from about 35° to about 45° for from about 12 to about 16 hours, and preferably from 12 to 14 hours. Next, it is heated at from about 55° to about 65° for from about 1¼ to about 1¾ hours. If, however, it has been heated for more than 14 hours in the first stage, the second stage time preferably is reduced correspondingly, so that a polymer heated at 40° C. for 16 hours is heated for not more than 1 hour at 60° C. in the second stage.

After the second stage, the molds can be degreased in vapors of an organic solvent, such as 1,1,2-trichloroethane, at from 60° C. to 90° C. The vapors remove any polymer adhering to the mold and gasket, and also preheat the molds for the last heating stage. The degreasing requires only a few minutes.

After degreasing, or directly after the second stage heating if degreasing is omitted the polymer is subjected to a third heating stage at from about 80° to about 110° C. for from about 8 to about 50 minutes.

After the third heating stage, if the molds have not been previously degreased, they may now be degreased, again at a temperature within the range of 60° C. to 90° C.

If the degreasing stage is omitted, the dwell time in the third stage is increased by from 2 to 4 minutes.

Changes in the heating time in the third stage according to the degreasing are essential. Because the degreasing is carried out at elevated temperatures, very close to the third stage heating temperature, polymerization continues during the degreasing. Therefore, the time must be controlled carefully so as to avoid carrying the polymerization too far during the heating.

The final polymerization is effected at a high temperature within the range from about 125° to about 235° C., and is continued until polymerization is complete. This usually is quite rapid and requires only a few minutes. As little as one to three minutes at 175° C. and above is usually sufficient although at lower temperatures or in the case of quite thick optical articles, from ten to twenty minutes may be required. If the article is cylindrically curved, or is flat, and the polymer is heat-resistant, there is not time limit on this stage.

This temperature is easily attained under infra red radiation. The duration of the high temperature treatment should not be over-extended beyond that needed for conversion to the final hard set stage, since the finished polymer may be harmed after long exposure to high temperatures. However, the polymer including triallyl cyanurate is more resistant to such damage than is the polymer containing only the polyol(allyl carbonate) polymer.

Any high temperature bath or source of infra red radiation can be used. An infra red bar or infra red lamps are quite satisfactory. An oven heated by infra red radiation is convenient to use. Baths of hot glycerine are also satisfactory.

In making plano lenses, the polymerization is carried out in a rising cycle, increasing the temperature after the initial stage gradually to the end. The first stage is at a low even temperature of from about 35° to about 65° C. because the initial reaction from the liquid to the gel stage is exothermic, and the heat liberated must be removed, and at a low temperature the reaction is slowed sufficiently to permit efficient heat removal. The later stages are at a gradually rising temperature, first at from 2° to 7° C. per hour, and then at from 5° to 12° C. per hour. This is done as rapidly as may be desirable, until the polymer has been converted from the gel stage, and heated at a final temperature of from about 125 to about 235° C. to a hard set.

The time required for initial polymerization depends upon the monomers present, the catalyst and the temperature, and is readily determined by a trial run on a small sample. A longer time is required at the lower temperatures. In the initial stage of the curing cycle just mentioned, the time would be within the range from 2 to 6 hours. In the second slow-rising temperature stage, from 5 to 9 hours, and in the final fast-rising temperature stage from 5 to 9 hours, are adequate. These times will differ according to the temperature and are not critical. The total time ranges from 12 to 20 hours.

The final high temperature treatment at from about 125 to about 235° C. also assists in releasing the surface of the optical article from the mold surface. At the time that the polymer is subjected to high temperature treatment it may still adhere strongly to the mold surface, and this of course is important both in preventing lateral shrinkage and cracking of the article and in maintaining optical accuracy of its surface. The high temperature treatment greatly weakens this bond, so that it facilitates the removal of the article from the mold. It also diminishes the rigidity of the polymer so that it may more easily separate from the mold without undue internal stress that might cause cracking of lens or mold.

After the high temperature treatment, the mold is opened and the lens removed. The lens can be processed directly, for edging and use, for instance. The molds can be cleaned and refilled for another cycle.

An additional heat treatment or post-cure at a temperature of at least 75° C. up to about 150° C. can be effected to relieve internal stresses and to bring the surface to its final optical shape, relaxing surface imperfections acquired after the polymer has reached the hard set stage. Such a treatment will require as little as one minute, and is not harmful.

In post-cure the material is already quite hard and free of catalyst. Further chemical cross-linking can occur only through high temperature or ultraviolet activation of residual unsaturation. The latter arc can make the material without degrading the material, the better the final product. On cooling, the full hardness is realized. A favorable factor is the presence of trifunctional groups because they tend to make the cross-links more uniformly distributed.

Thereafter the processing of both corrective and ophthalmic lenses is the same. The lens is subjected to a post cure at an elevated temperature of from about 90° to about 125° C. until the hardness has reached its limit. This may require from ½ to 4 hours or even longer. At this stage, it is assumed the properties of the lens have been stabilized.

Although the invention has its best application in the preparation of ophthalmic lenses, it will be apparent to those skilled in the art that the process of the invention is applicable to the production of all types of curved optical articles of high precision and optical accuracy, such as lenses for binoculars, microscopes, gas masks, loupes, telescopes, instrument dials, magnifying glasses, prisms, convex and concave mirrors, and the like. It is of especial application for the manufacture of spectacle lenses and these are described as illustrative of the process in the examples which follow, and which, in the opinion of the inventor, represent the best embodiments of his invention.

*Example 1*

A monomer composition was made up composed of 400 parts of diethylene glycol bis(allyl carbonate) (CR 39) and 22 parts of isopropyl percarbonate (5.5%) which was dissolved in the resin monomer. The monomer was filled into a group of molds for casting negative ophthalmic lens. The molds were formed of two glass halves corresponding in inside configuration to the lens desired, separated by a flexible gasket, whose inner configuration conformed to the exterior side of the lens, and held together by a clip.

The molds after filling were put in an oven and held at 40° C. (oven temperature) for 6½ hours. They were then removed and held in a second oven at 60° C. for 45 minutes, and put in a third oven held at 90° C. for 20 minutes. The molds were degreased in 1,1,2-trichloroethane vapor for 2 minutes, the clips removed, and the molds then subjected to infrared radiation at 175° C. for 3 minutes.

The mold halves separated from the lenses during the infrared treatment. Lenses were produced which were quite hard, had good scratch-resistance, surpassed optical specifications, and had no surface imperfections or cracks.

*Example 2*

A composition was made up composed of 206 parts diethylene glycol bis(allyl carbonate) (CR 39), 72 parts vinyl acetate and 11.3 parts isopropyl percarbonate. The composition was filled into negative molds of the type described in Example 1 for casting negative ophthalmic lenses.

The molds were placed initially in an oven held at 40° C. for 8½ hours, then in an oven held at 60° C. for 45 minutes and then degreased with 1,1,2-trichloroethane vapor for 2 minutes. Finally, they were held in an oven at 90° C. for 10 minutes.

The clips were removed and the molds subjected to infrared radiation at 115° C. for 1.5 minutes. The mold halves separated from the lenses during the radiation. Lenses were obtained which were hard, had good scratch-resistance, surpassed optical specifications and had no surface imperfections or cracks.

*Example 3*

A monomer composition was made up composed of 9 parts diethylene glycol bis(allyl carbonate) (CR 39), 1 part triallyl cyanurate and 0.5 part isopropyl percarbonate. The monomer was filled into a group of molds shaped to cast negative ophthalmic lenses. The molds were formed of two glass halves corresponding in inside configuration to the lens desired, separated by a flexible gasket, whose inner configuration conformed to the exterior side of the lens, and held together by a clip.

After filling, the molds were placed in an oven held at 40° C. (oven temperature) for 9 hours. They were then removed and put in a second oven held at 60° C. for 2½ hours, after which they were held in a third oven at 90° C. for 15 minutes. The molds were degreased in 1,1,2-trichlorethane vapor for 2 minutes.

The clips were removed, and the molds subjected to infrared radiation at 200° C. for 3 minutes. The mold halves separated from the lenses during the radiation. Lenses were produced which had a hard, scratch-resistant surface, were very resistant to heat distortion, surpassed optical specifications and had no imperfections or cracks.

*Example 4*

A monomer composition was made up composed of 10.3 parts of diethylene glycol bis(allyl carbonate) (CR 39), 1 part ethylene glycol maleate, 0.67 part triallyl cyanurate and 0.59 part isopropyl percarbonate. The monomer was filled into a group of molds for casting negative lenses, as set forth in Example 1. The filled molds were held in an oven for 14 hours at 40° C., in a second oven at 60° C. for 1 hour and in a third oven at 75° C. for 30 minutes. They were then degreased with 1,1,2-trichlorethane vapor for 2 minutes and put in a fourth oven where they were held at 90° C. for 25 minutes.

The clips were removed, and they were then subjected to a 7 minute infrared radiation treatment at 175° C. The mold halves separated from the lenses during the treatment. Lenses quite resistant to heat distortion were obtained which had hard, scratch-resistant surfaces, surpassing optical specifications, without imperfections or cracks.

*Example 5*

A monomer composition was made up composed of 400 parts diethylene glycol bis(allyl carbonate) (CR 39), 40 parts of triallyl cyanurate (10%) and 12 parts of isopropyl percarbonate (3%). This monomer composition was held at 5.5° C. until ready for filling into molds. It was then filtered, using Fiber Flow 7C filter aid, into the mold-filling equipment. This equipment permitted gravity feeding of the monomer composition into plano cylinder gas mask molds formed of two glass mold pieces to produce lenses of zero power.

The mold halves were separated by a flexible gasket whose inner configuration conformed to the exterior side of the lens, and were held together by a clip.

The molds were filled by pulling out the gasket sufficiently far to permit injection of the monomer composition into the space between the mold halves. The composition was run in slowly to prevent the entrapment of bubbles, and allowed to overflow to make certain that the cavity was full. The molds were degreased in cold solvent vapor (1,1,2-trichloroethane at 16° C.), loaded into racks and put in an oven held at 49° C. (oven temperature) for 2½ hours. The temperature was then increased at the rate of 2.5° C. for 2 hours, 5° C. for 6½ hours and 10° C. for 4 hours, at which time the temperature was 90° C. They were held at 90° C. for 3 hours, after which they were degreased in 1,1,2-trichloroethane at 75° C. for 2 minutes.

The clips on each mold were then removed, and they were subjected to infra red radiation at 175° C. for 1.5 minutes. The mold halves separated from the lenses during the irradiation. An 80% yield was obtained of gas mask lenses which were quite hard. They had good scratch-resistance and resistance to heat distortion, remarkable ball-drop resistance at low temperatures as low as —80° F., surpassed optical specifications, and had no surface imperfections or cracks. Mold breakage was less than 1%.

*Example 6*

Example 5 was repeated, employing, in lieu of the CR 39, ethylene glycol bis(allyl carbonate). Lenses were produced whose surfaces were hard and scratch-resistant, and optically accurate.

*Example 7*

A monomer composition was prepared composed of 100 parts diethylene glycol bis(allyl carbonate) (CR 39), 12.5 parts ethylene glycol maleate and 6 parts isopropyl percarbonate. This composition was filled into positive molds made up of 2 mold halves whose inner surface configuration corresponded to the exterior top and bottom of the lens separated by a flexible gasket corresponding to the side configuration of the lens and held together by a clip.

The filled molds were put in an oven and held at 40° C. for 12 hours. They were then removed and put in a second oven held at 60° C. for 1¼ hours. The molds were degreased with 1,1,2-trichlorethane vapor for 2 minutes and then put in a third oven held at 90° C. for 30 minutes. The clips were removed, and they then were subjected to infra red radiation at 175° C. for two minutes. The mold halves separated from the lenses during infra red radiation. Lenses were obtained whose surfaces were hard and scratch-resistant, surpassed optical specifications, and were free from other imperfections such as cracks.

*Example 8*

A monomer composition was made up composed of 200 parts diethylene glycol bis(allyl carbonate) (CR 39), 20 parts triallyl cyanurate and 6 parts isopropyl percarbonate. The composition was filtered and filled into a group of glass ophthalmic lens molds of the type of Example 1, producing lenses of —8.50 sphere combined with 0.00 cylinder. The molds were put in racks and placed in an oven held at 40° C. for 14 hours, after which they were put in a second oven held at 60° C. for 1⅔ hours. The molds were then put in a third oven held at 90° C. for 9 minutes, and then degreased in 1,1,2-trichloroethane vapor at 75° C. for 2 minutes.

The clips were removed, and the molds subjected to infra red radiation for 1.5 minutes. The mold halves separated from the lenses during irradiation. A 60% yield was obtained of lenses resistant to heat distortion which had hard, scratch-resistant surfaces, which surpassed optical specifications and which were free from surface imperfections and cracks. Mold breakage was less than 1%.

*Example 9*

A monomer composition was prepared composed of 100 parts diethylene glycol bis(allyl carbonate) (CR 39), 10 parts ethylene glycol maleate and 5.5 parts isopropyl percarbonate. This composition was filled into molds to give a 6 base plano lens made up of 2 mold halves whose inner surface configuration corresponded to the exterior top and bottom of the lens separated by a flexible gasket corresponding to the side configuration of the lens and held together by a clip.

The filled molds were put in an oven and held at 40° C. for 12 hours. They were then removed and put in a second oven held at 60° C. for 1¾ hours. The molds were degreased with trichloroethane vapor, put in a third oven held at 90° C. for 48 minutes. The clips were removed, and they then were subjected to infra red radiation at 175° C. for 8 minutes. The mold halves separated from the lenses during the irradiation. Lenses were obtained whose surfaces were hard and scratch-resistant, surpassed optical requirements, and were free from other imperfections such as cracks.

*Example 10*

Example 9 was repeated but instead of subjecting the molds to infra red radiation, they were put in a bath of hot glycerine held at 125° C. for 5 minutes. The mold halves separated from the lenses while in the bath and lenses were obtained whose surfaces were hard and scratch-resistant, surpassed optical requirements and were free from other imperfections such as cracks.

I claim:

1. A process for manufacturing curved optical articles of high precision from synthetic resinous materials which comprises polymerizing in a two piece glass mold made of movable mold pieces, and at a temperature within the range from about 25° to about 120° C., a composition comprising a liquid monomeric polymerizable mixed ester of a polyhydric alcohol with an acid ester of carbonic acid and an unsaturated alcohol having polymerizable ethylenic unsaturation, and a polymerization catalyst therefor in an amount of at least 1% by weight of the monomer, until polymerized to a solid relatively hard gel, and then heating the gel without removing it from the mold at a temperature within the range from about 125° to about 235° C. until polymerized to a final hard set.

2. A process in accordance with claim 1 in which the polymerization is carried out under ultraviolet light.

3. A process in accordance with claim 1 in which the composition also comprises a minor proportion of a second monomer copolymerizable with the first-mentioned monomer.

4. A process in accordance with claim 3 in which the second copolymerizable monomer is ethylene glycol maleate.

5. A process in accordance with claim 3 in which the second copolymerizable monomer is triallyl cyanurate.

6. A process in accordance with claim 1 in which the monomer is diethylene glycol bis(allyl carbonate).

7. A process in accordance with claim 1 in which the polymerization is carried out by heating in three stages, the first at a temperature within the range from 35° to 45° C., the second at a temperature within the range from 55° to 65° C. and the third at a temperature within the range from 80° to 110° C., until at least 80% of the monomer has been polymerized to the infusible relatively hard stage but short of a final hard set, and then the polymer subjected to a high temperature heat treatment within the range from about 125 to about 235° C. until polymerized to a final hard set.

8. A process in accordance with claim 1 in which the polymerization is carried out by heating in three stages, the first at a temperature within the range from about 35° to about 65° C., the second at a gradually rising temperature of from 2 to 7° C. per hour and the third at a gradually rising temperature of from 7 to 12° C. per hour, continuing the heating until the polymer has been converted to a final hard set.

9. A process in accordance with claim 1, in which the final hard set polymer is subjected to a post cure at a temperature within the range from about 75 to about 150° C. until the properties of the article are stabilized.

10. A process for manufacturing lenses from synthetic resinous materials which comprises polymerizing in a two piece glass mold separated by a compressible gasket and held together by a clip, and at a temperature within the range from about 25° to about 120° C., a composition comprising a liquid monomeric polymerizable mixed ester of a polyhydric alcohol with an acid ester of carbonic acid and an unsaturated alcohol having polymerizable ethylenic unsaturation, and an oxygen-containing polymerization catalyst therefor in an amount of at least 1% by weight of the monomer, until polymerized to a solid relatively hard set, and then heating the polymer without removing it from the mold at a temperature within the range about 125° to 235° C. to release the lens from the mold surface and then removing the finished lens from the mold.

11. A process for manufacturing optical articles from synthetic resinous materials which comprises polymerizing in a glass mold at a temperature within the range from about 25 to about 120° C. a composition comprising a liquid monomeric polymerizable mixed ester of a polyhydric alcohol with an acid ester of carbonic acid and an unsaturated alcohol having polymerizable ethylenic unsaturation, and an oxygen-containing polymerization catalyst therefor in an amount of at least 1% by weight of the monomer, until polymerized to a solid relatively hard set and then heating the article at a temperature within the range from about 125° to about 235° C. to release the article from the mold and then removing the article from the mold.

References Cited in the file of this patent
UNITED STATES PATENTS

| Number | Name | Date |
|---|---|---|
| 2,385,486 | Bartoe et al. | Sept. 25, 1945 |
| 2,390,129 | Shobert | Dec. 4, 1945 |
| 2,392,578 | Chenicek | Jan. 8, 1946 |
| 2,409,958 | Rogers et al. | Oct. 22, 1946 |
| 2,443,737 | Kropa | June 22, 1948 |
| 2,475,194 | Nyquist et al. | July 5, 1949 |
| 2,579,596 | Minter et al. | Dec. 25, 1951 |
| 2,583,150 | Minter et al. | Jan. 22, 1952 |
| 2,643,983 | Dangelmajer | June 30, 1953 |
| 2,819,247 | Lundberg | Jan. 7, 1958 |

OTHER REFERENCES

Bjorksten et al.: "Polyesters and their Applications," published 1956 by Reinhold Publ. Corp., page 49.